United States Patent [19]

Mody et al.

[11] Patent Number: 5,600,224
[45] Date of Patent: Feb. 4, 1997

[54] APPARATUS AND METHOD FOR CHARGING ONLY RECHARGEABLE BATTERIES

[75] Inventors: Deepak R. Mody, Parkland, Fla.; Arun K. Krishnamurthy; Kin S. Liew, both of Singapore, Singapore; Anh X. Nguyen, Boynton Beach, Fla.

[73] Assignee: Motorola, Inc., Schaumburg, Ill.

[21] Appl. No.: 454,933

[22] Filed: May 31, 1995

[51] Int. Cl.[6] ............................................. H02J 7/00
[52] U.S. Cl. .................................... 320/2; 320/48
[58] Field of Search ............................ 320/2, 15, 48; 429/7, 178

[56] References Cited

U.S. PATENT DOCUMENTS

| 4,577,144 | 3/1986 | Hodgman et al. | 320/2 |
| 5,485,090 | 1/1996 | Stephens | 324/433 |

*Primary Examiner*—Peter S. Wong
*Assistant Examiner*—Patrick B. Law
*Attorney, Agent, or Firm*—Philip P. Macnak

[57] ABSTRACT

A battery charger which electronically discriminates between rechargeable and non-rechargeable batteries, and which charges only rechargeable NiCd batteries. This feature is made possible due to the variation in the internal resistances between various types of battery cells.

11 Claims, 2 Drawing Sheets

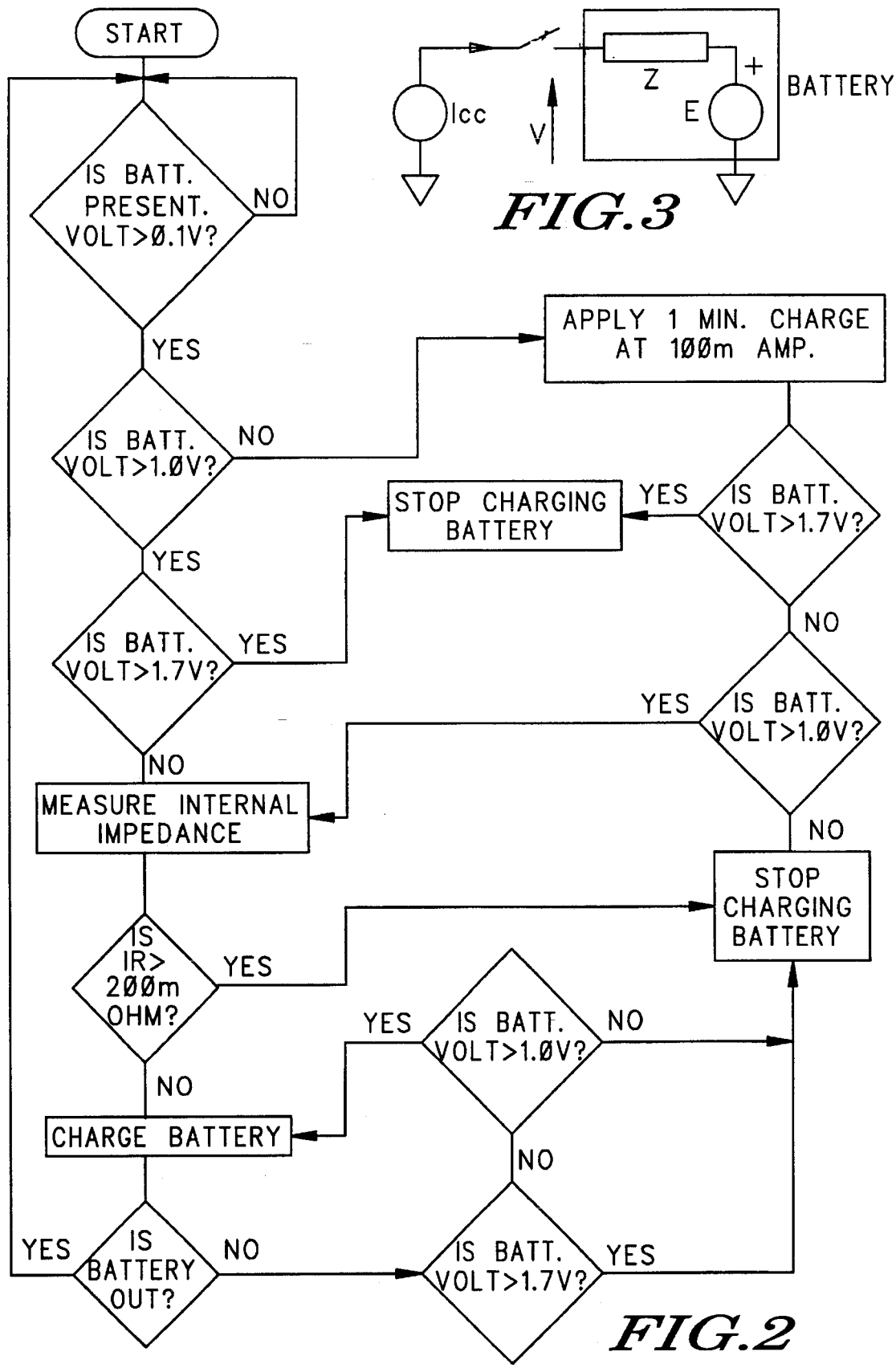

5,600,224

APPARATUS AND METHOD FOR CHARGING ONLY RECHARGEABLE BATTERIES

FIELD OF THE INVENTION

The present invention relates generally to small, single cell battery chargers, and more particularly, to a single cell battery charger which electronically discriminates between single cell rechargeable and non-rechargeable batteries, and which charges only the rechargeable batteries.

BACKGROUND OF THE INVENTION

Many portable electronic devices rely on one or more single-cell batteries for power. The plethora of different electronic devices, such as pagers, cellular phones, portable radios, portable CD players, flashlights, and other battery powered electronic equipment in use has created a great volume demand for single-cell battery power, resulting in the sale of both rechargeable and non-rechargeable single-cell batteries. The voltages and physical sizes of these batteries are standardized. For example, the AA 1.2-volt battery may be purchased as either rechargeable or non-rechargeable. Non-rechargeable single-cell batteries, such as AA 1.2-volt alkaline or carbon zinc batteries, are relatively expensive and need frequent replacement. The throw-away, or spent, batteries have themselves become an environmental concern, constituting hazardous waste.

Rechargeable batteries, such as nickel cadmium (NiCd) are available in conventional and identical sizes and substantially identical voltages as the non-rechargeable single cell batteries and are often used interchangeably with non-rechargeable batteries. The interchangeable use of either rechargeable or non-rechargeable small single cell batteries creates a problem for the user to distinguish between the rechargeable or non-rechargeable batteries, especially when dealing with a battery charger. To insert a non-rechargeable battery into a single cell battery charger creates a hazardous condition that can result in injury or damage due to leakage of chemicals from the non-rechargeable battery when recharging is accidentally attempted.

In the past, the battery charger itself or the battery would include a mechanical configuration to prevent the insertion or use of a nonrechargeable battery into the battery charger. Such mechanical configuration of either the battery charger or the battery adds additional expense to both components and the batteries of unique mechanical configuration are not readily available in stores. The present invention overcomes these problems by providing a battery charger that can, within seconds, electrically distinguish between a non-rechargeable and rechargeable single cell battery and charge only a rechargeable battery and stop charge to a non-rechargeable battery.

BRIEF DESCRIPTION OF THE DRAWINGS

FIG. 2 is flow chart that represents a battery check cycle of a battery charger that embodies the present invention.

FIG. 3 shows an equivalent circuit diagram for internal resistance measurement.

DESCRIPTION OF THE PREFERRED EMBODIMENT

Figure 1:
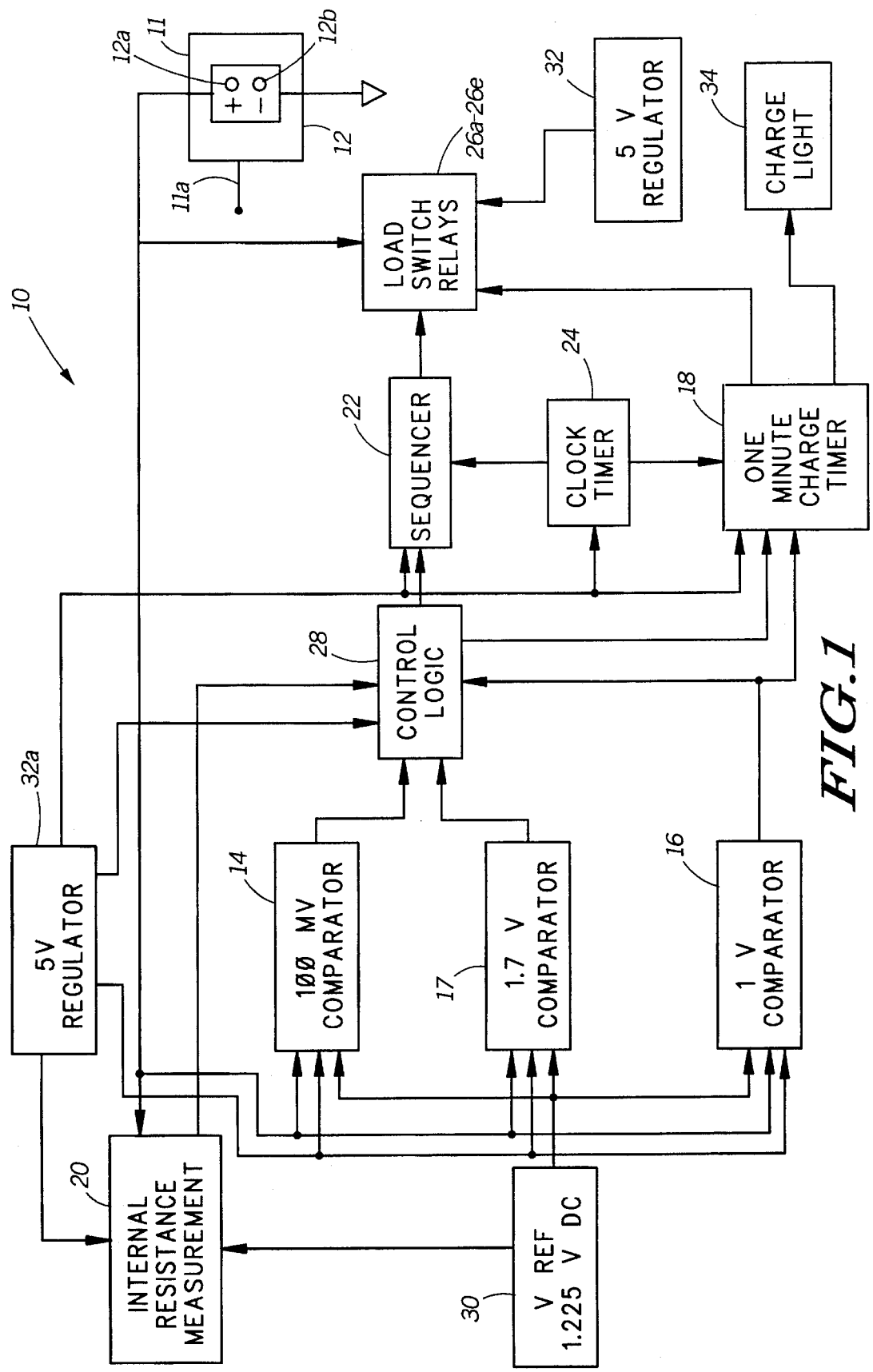
FIG. 1 is a block diagram of a battery charging device in accordance with the present invention.

The single cell battery charger of the present invention can discriminate between a single non-rechargeable and rechargeable batteries by measuring the known quantifiable differences in the internal battery impedance, that normally occurs when comparing the rechargeable battery and a non-rechargeable battery. Such electrical impedance can be determined by placing a test charge into the battery, once inserted into the battery charger, and by using equivalent circuitry, measure the resultant impedance from the test charge. Based on that impedance measurement, it can be determined whether the battery inserted into the charger is either a non-rechargeable battery or a rechargeable battery. Using this information, the battery charger control can then proceed with charging a rechargeable battery or suspend or prevent charging if it is determined electrically that the inserted battery is a non-rechargeable battery.

Referring now to the drawings, and referring to FIG. 1, a battery charger in accordance with the present invention is shown schematically, generally designated by the reference numeral 10. The battery charger 10 includes a single cell battery holder 12 having anode 12a and cathode 12b contacts that engage a conventional single cell battery 11 received into the battery holder 12 for recharging.

Because the physical configuration and size (including dimensions of a AA single cell battery) is virtually identical between a non-rechargeable battery and a rechargeable battery, it would be easy for a person to interchange or confuse which battery should be inserted into the charger. This invention will prevent damage or hazard if the wrong battery is inserted.

FIG. 1 shows the overall invention which includes an internal resistance measurement circuit 20, a group of comparators 14, 16, and 17 and a reference voltage 30, all of which are controlled by control logic 28 in conjunction with a clock timer 24. Relays 26a through 26e are used for switching in accordance with signals from the control logic. The essence of the device is that regardless of what type battery 11 is inserted into the battery holder 12, the system will automatically determine whether or not, electrically, a rechargeable or non-rechargeable battery 11 is in the battery holder. Fundamentally this is through the internal resistance measurement circuit 20, which can tell the system what type of battery is in the holder. If a non-rechargeable battery is in holder 12, the system will not charge that battery. If a rechargeable battery is in holder 12 then the system will go through its sequencing providing a test current and once it's determined to be a rechargeable battery, the system will proceed with the charging.

The battery charger 10 is typically used in conjunction with a portable electronic device (not shown), such as a radio pager or cellular telephone that can receive either a rechargeable or non-rechargeable battery. The charger 10 is connected to an AC power supply through adapter 11a for operating current and charging current.

The battery charger circuitry is constantly looking for voltage across the two terminals 12a and 12b in the battery holder 12. When a battery 11 is inserted into the battery holder 12, an emf is detected by a 100 mV comparator 14. The output of comparator 14 is used as a rising edge to provide a start signal to the circuit via first and second monostables, such as a 74HC4538A (not shown). The first monostable provides a delay of one second, and the second monostable provides a narrow start pulse. The reason for the one second delay and the narrow start pulse will be described in greater detail below.

A comparator 17, which in the preferred embodiment is a 1.7 mV comparator, is used to detect a battery out condition (e.g. the constant current source pulls the holder 12 terminal voltage to supply rail voltage when the battery is removed), which will be described in greater detail below.

It should be noted that the 100 mV comparator 14, the 1-volt comparator 16, and the 1.7-volt comparator 17, are all tied together by at least one common input. Therefore, all three terminal voltage measurements are essentially done simultaneously. The outputs of comparators 14, 16 and 17 are coupled to the control logic circuitry 28, and based upon an individual comparator's output, a different control logic function is performed. For example, as soon as 100 mV comparator 14 detects that a battery is present in the charger, a strength test is performed on the battery 11. One-volt comparator 16 indicates whether the battery 11 inserted into the holder 12 is a weak battery or a strong battery. If the battery 11 is weak (e. g. less than 1 volt), then the battery 11 needs to be charged for a short period of time so that an accurate internal resistance measurement can be taken.

First and second monostables are contained in the control logic circuitry 28. The output of 1 volt comparator 16 is used to trigger a pre-test charge at 100 milliamps for approximately one minute. This is accomplished by inverting the output of 1-volt comparator 16, and inputting that inverted output and the output of the second monostable that provides the narrow start pulse to an AND gate whose output is connected to timer 18. The output of the first monostable that provides the one-second delay is input into the monostable that provides the narrow start pulse. Upon activation of one minute timer 18, two load switch relays, 26c and 26e, each driven by relay drivers, close to provide 100 milliamps of charge current to the battery cell. The 5 volt regulator 32 is coupled to each load switch relay 26a–26e to charge the battery. A second 5-volt regulator 32a provides Vcc to all the other electronics of the system. A charge light 34 is used as a visual indicator and may take the form of a light emitting diode (LED). Such visual indicator is connected to indicate when the charging current is on. This one-minute charge at 100 milliamps "revives" relatively deeply discharged NiCds to restore the internal resistance characteristic. As mentioned above, one minute timing is provided by a third monostable, one minute charge timer 18. After the battery has been charged for one minute at 100 milliamps, the battery terminal voltage should go above 1 volt DC if the battery is a "good" battery. If the battery does not go above 1 volt DC after the one minute charge, then the control logic 28 will automatically stop charging the battery by clearing a latch in the control logic 28 circuitry whose output controls the main charging relay 26c. However, if the battery terminal voltage is above 1 volt and below 1.7 volts, then an internal resistance measurement is performed by the internal resistance measurement 20 (as described below) in the situation where a battery having a terminal voltage greater than 1 volt is initially inserted in the battery holder.

When a battery having a terminal voltage above 1 volt is inserted, the internal resistance measurement is triggered. The internal resistance measurement circuit 20 is responsible for measuring the internal resistance of the battery 11. This is done by evaluating the difference in voltage between an unloaded battery and the voltage across the battery 11 when a constant current load is applied to the battery 11. This voltage difference is in the form of an analog signal, which is compared to a predetermined threshold voltage value V ref 30, which in the preferred embodiment is 1.235 VDC. Therefore, a single logical value, or a single bit resulting from the aforementioned voltage comparison, is retained in memory such as a flip-flop or a latch, which can be used to distinguish NiCd rechargeable batteries from non-rechargeable batteries.

Referring to FIG. 3, an equivalent circuit for internal resistance measurement is shown, wherein V represents the closed circuit voltage, E represents the open circuit voltage, Icc represents the constant current source current, and Z represents the internal resistance. Therefore, $V=E+Icc \times Z$. Consequently, $Z=(V-E) \div Icc$. A constant current source is used to measure the internal resistance of the cell. To allow for a sizable voltage difference, which enables accurate measurement, a current of 0.5 amps is chosen. Thus, the internal resistance equals $2 \times (V-E)$. The internal resistance of a battery is also determined by the state of its charge. A single cell battery which is nearly fully discharged will exhibit high values of internal resistance. In order to bring a discharged NiCd battery to its typical internal resistance range, a 100 mA initial charge is applied for approximately one minute by timer 18 as described above.

Triggering of internal resistance measurement circuit 20 occurs when the start signal provided by comparator 14 via the first and second monostables contained in control logic 28 is latched by a flip-flop which is also contained in control logic 28. The output of that flip-flop starts sequencer 22, which in the preferred embodiment is a 4-bit shift register, which is clocked with a period of 2.7 milliseconds from clock timer 24. The outputs of sequencer 22 are used to step through the internal resistance measurement sequence. The first step in the internal resistance measurement sequence measures open circuit voltage E by closing a load switch relay 26a and a sample and hold op amp configuration contained in internal resistance module 20. The second step closes another relay, 26b, and opens relay 26a. The third step closes relays 26c and 26d to supply 0.5 amps load to the battery terminals. At this point, the battery terminal voltage is buffered by another op amp contained within the internal resistance measurement 20, thus obtaining the closed circuit voltage V. These two voltages, E and V, are fed into a differential amplifier. The output of the differential amplifier, which is proportional to the internal resistance of the battery 11, is then compared against a precision voltage reference 30 of 1.235 volts. The last step uses the complement of the clear signal to the shift register provided by the flip-flop in the control logic 28, to latch the internal resistance measurement circuit 20 comparator output (as a logic level) into a second flip-flop contained in the control logic 28.

If the differential amplifier output exceeds 1.235 volts, the battery 11 is deemed non-rechargeable and the control logic 28 disables further charge by outputting a low from the second flip-flop, which is coupled to the load relay switches, thereby opening main charging relay 26c, thus disabling further charge. If the differential amplifier output is less than 1.235 volts, then charging at 35 milliamps constant current is initiated by closing main charging relay 26c. This continues until either the battery 11 is removed or until a limit of 1.7 volts across the battery terminals is exceeded. When the terminal voltage exceeds 1.7 volts, the output of 1.7-volt comparator 17 is input to a latch in the control logic 28, preferably in the form of a flip-flop, which is cleared. As described above, this output of comparator 17 controls the main relay, 26c, which couples the battery 11 to the constant current source. Thus, when the latch is cleared, all charging is halted. This occurs when the battery 11 is removed during charge, as the relay is closed and thus pulling the holder to the rail voltage. Therefore, the output of this latch, which is coupled to 1.7-volt comparator 17, can also be used to distinguish the absence of the battery 11. Also, the output of this latch is used to clear the flip-flops coupled to the internal resistance measurement circuit 20 and the timer 18.

As described above, when a battery below 1 volt is inserted into the holder 12, a start signal from 100 millivolt comparator 14 initiates the internal resistance measurement process. One volt comparator 16 will signal that a battery of less than 1 volt has been inserted into the holder. Control logic 28 will delay firing internal resistance measurement circuit 20 until one minute charge timer 18 completes. Upon activation of one minute charge timer 18, relays 26e and 26c close to provide 100 milliamps of charge current to the battery within the holder. After the one-minute charge time has completed, the battery 11 is tested to determine whether the voltage across the terminals is greater than 1.7 volts. If the battery 11 voltage is greater than 1.7 volts after the one-minute 100 milliamp charge, then charging is halted as described above. If the battery 11 voltage remains below 1 volt after the one-minute 100 milliamp charge, then again, the charging of the battery is halted. If the terminal voltage of the battery after the one minute charge is within the predetermined threshold range (e.g. between 1 volt and 1.7 volts), then an internal resistance measurement as described above is performed. If the internal resistance is below the threshold value, then the battery 11 is charged at 35 milliamps constant current and the charging continues until the battery 11 is either removed or until a limit of 1.7 volts across the battery terminals is exceeded.

Referring to FIG. 2, a flow diagram is shown wherein the 100 mV comparator determines whether a battery is present or not. If a battery is in the holder (e.g. terminal voltage greater than 0.1 volts), then a determination of whether the terminal voltage of the battery is above 1 volt is made. If a battery with a terminal voltage above 1 volt is inserted, then a determination of whether the terminal voltage of the battery is above 1.7 volts is made. If a battery with a terminal voltage above 1.7 volts is inserted into the holder, then the charging of the battery is terminated since a terminal voltage value above 1.7 volts means that a non-rechargeable type battery was mistakenly inserted into the battery holder. If a battery with a terminal voltage between 1 volt and 1.7 volts is inserted, then an internal resistance measurement is done. If the internal resistance is greater than the threshold value of 200 milliohms, then charging of the battery is terminated since a value of internal resistance greater than 200 milliohms means that a nonrechargeable type battery was mistakenly inserted into the battery holder. If the internal resistance is less than 200 milliohms, then the inserted battery is charged at a 35 milliamp constant current, and that charging continues until the battery is either removed or until a terminal voltage limit of 1.7 volts across the battery terminals is exceeded.

If the inserted battery has a terminal voltage less than 1 volt when initially measured, then a charge of 100 milliamps is applied for a period of one minute. After the one minute, 100 milliamp charge, the battery is tested to determine whether the voltage across the terminals is greater then 1.7 volts. If the terminal voltage of the battery is greater than 1.7 volts, then the charging of the battery is terminated since the inserted battery is a nonrechargeable type battery. If the voltage across the terminals is less than 1.7 volts after the one-minute charge at 100 milliamps, and less than 1 volt after the one-minute charge at 100 milliamps, the charging of the battery is terminated as the battery is either a bad rechargeable battery or a nonrechargeable battery. If the voltage of the battery is less than 1.7 volts but greater than 1 volt, then an internal resistance measurement as described above is performed. If the internal resistance is below the threshold value, then the battery is charged at 35 milliamp constant current and this charging continues until the battery is either removed or until a limit of 1.7 volts across the battery terminals is exceeded.

In summary, insertion of a non-rechargeable single cell battery such as a AA or AAA size battery into a battery charger can result in hazard due to leakage of chemicals from the non-rechargeable battery.

Because of the large number of rechargeable or non-rechargeable batteries being sold to consumers today, it is not difficult to mistakenly insert the wrong battery into the battery charger. The present invention eliminates this hazard or danger because if the wrong battery is placed in the battery charger in accordance with the present invention, no charging will occur. If the proper battery is inserted into the battery charger, the battery will be appropriately charged.

The system can include external alarms or external lights that indicate when the improper battery has been inserted into the holder so that the user will know immediately to remove the non-rechargeable battery from the holder. Other logic conditions can be provided that are commensurate with the operation of the device.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A battery charger that can discriminate between a rechargeable battery and a non-rechargeable battery, said battery charger coupled to an external electric power source for providing electric power for recharging a battery, said battery charger comprising:

a battery holder for receiving the battery;

an anode contact and a cathode contact connected to said battery holder in predetermined positions for electrical contact with the battery when inserted into said battery holder;

charging current control means coupled to said cathode contact and said anode contact for controlling charging current supplied to said anode contact and said cathode contact;

means coupled to said charging current control means for supplying a predetermined-amount of charging current to said anode contact and said cathode contact for a predetermined period of time;

means coupled to said anode contact and said cathode contact for measuring internal impedance of the battery within said battery holder to be charged, the battery being in contact with said anode contact and said cathode contact, wherein said means for measuring internal impedance comprises:

means for measuring an open cell voltage;

means for measuring a closed cell voltage with fixed load;

means for determining a voltage difference between said open cell voltage and paid closed cell voltage;

means for generating a preselected reference voltage coupled to said means for determining, said voltage difference being compared to said preselected reference voltage, whereby the battery is deemed non-rechargeable when said voltage difference exceeds said preselected reference voltage and rechargeable when said voltage difference is less than said preselected reference voltage; and means for terminating the charging current coupled to said charging current control means and said means for measuring internal impedance to terminate charging the battery when the internal impedance exceeds a predetermined threshold value, whereby said battery charger can discriminate between the rechargeable battery or the non-rechargeable battery based on internal impedance.

2. A battery charger as recited in claim 1, wherein said charging current control means comprises:

a control logic circuit; and comparator means coupled to said control logic circuit for determining threshold voltage of the battery.

3. A battery charger as recited in claim 1, wherein said means for supplying the predetermined amount of charging current comprises:

a load switch relay circuit;

a sequencer coupled to said load switch relay circuit; and timer means for providing said predetermined period of time coupled to said load switch relay circuit.

4. A battery charger as recited in claim 1, wherein said means for terminating the charging current comprises:

a load switch relay circuit.

5. A method for operating a battery charger that discriminates for charging purposes between a rechargeable battery and a nonrechargeable battery to prevent damage or injury which might result from charging a non-rechargeable battery, comprising the steps of:

(a) inserting a battery into a battery charger;

(b) measuring terminal voltage of the battery inserted in the battery charger;

(c) measuring internal resistance of the battery in said battery charger when said terminal voltage is within a predetermined voltage range;

(d) determining whether the internal resistance of the battery exceeds a threshold resistance value; and (e) terminating battery charging when the internal resistance of the battery exceeds the threshold resistance value, thereby indicating that the battery is a non-rechargeable battery.

6. A method as recited in claim 5, further including the step of stopping battery charging when said terminal voltage exceeds a predetermined voltage threshold.

7. A method as recited in claim 5, further including the steps of:

(a) applying a charge to the battery in said battery charger for a predetermined period of time when said terminal voltage is below said predetermined voltage range;

(b) measuring internal resistance of the battery in said battery charger after said charge has been applied to the battery for a predetermined time period;

(c) determining whether the internal resistance of the battery exceeds a threshold resistance value; and (d) terminating said charge when the internal resistance of the battery exceeds the threshold resistance value, indicating that the battery is a non-rechargeable battery.

8. A method as recited in claim 7, further including the step of again measuring terminal voltage of the battery inserted in said battery charger after applying said charge to the battery for a predetermined period of time.

9. A method as recited in claim 8, further including the step of stopping battery charging when said terminal voltage exceeds said predetermined voltage range.

10. A method as recited in claim 8, further including the step of stopping battery charging when the terminal voltage remains below the predetermined voltage range.

11. A battery charger that can discriminate between a rechargeable battery and a non-rechargeable battery, said battery charger coupled to an external electrical power source for providing electrical power for recharging a battery, said battery charger comprising:

a battery holder for receiving the battery to be charged;

an anode contact and a cathode contact connected to said battery holder in predetermined locations for electrical contact with the battery when inserted into said battery holder;

a battery charging current control switch coupled to said cathode contact and said anode contact for controlling a charging current to said anode contact and said cathode contact;

an internal resistance measurement circuit coupled to said anode contact for measuring terminal voltage of the battery, and for measuring internal impedance of the battery when said terminal voltage is within a predetermined voltage range; and a control logic circuit coupled to said internal resistance measurement circuit, and said battery charging current control switch for control thereof, and for terminating battery charging when the internal impedance of the battery exceeds a threshold impedance value, thereby indicating that the battery is a non-rechargeable battery.

* * * * *

UNITED STATES PATENT AND TRADEMARK OFFICE
CERTIFICATE OF CORRECTION

PATENT NO. : 5,600,224
DATED : February 4, 1997
INVENTOR(S) : Mody, et al.

It is certified that error appears in the above-indentified patent and that said Letters Patent is hereby corrected as shown below:

Claim 1, col. 6, line 52, before fixed load, insert --a--.

Claim 1, Column 6, line 54, change "paid" to --said--.

Signed and Sealed this

Nineteenth Day of May, 1998

Attest:

BRUCE LEHMAN

Attesting Officer

Commissioner of Patents and Trademarks